US008711197B2

(12) United States Patent
Dickerson et al.

(10) Patent No.: US 8,711,197 B2
(45) Date of Patent: Apr. 29, 2014

(54) SURVEILLANCE APPARATUS AND METHOD FOR WIRELESS MESH NETWORK

(75) Inventors: James W. Dickerson, Plano, TX (US);
Mark C. Cromwell, Plano, TX (US);
Dennis K. Smith, Plano, TX (US);
Mark S. Satinsky, Irving, TX (US)

(73) Assignee: Agilemesh, Inc., Richardson, TX (US)

( * ) Notice: Subject to any disclaimer, the term of this patent is extended or adjusted under 35 U.S.C. 154(b) by 1471 days.

(21) Appl. No.: 11/470,812

(22) Filed: Sep. 7, 2006

(65) Prior Publication Data

US 2007/0076094 A1   Apr. 5, 2007

Related U.S. Application Data

(60) Provisional application No. 60/715,305, filed on Sep. 9, 2005, provisional application No. 60/715,394, filed on Sep. 9, 2005, provisional application No. 60/715,381, filed on Sep. 9, 2005.

(51) Int. Cl.
*H04N 7/14* (2006.01)
*H04N 7/18* (2006.01)
*H04N 7/173* (2011.01)
*H04N 21/258* (2011.01)
*H04N 21/45* (2011.01)
*H04W 4/02* (2009.01)
*H04L 29/08* (2006.01)

(52) U.S. Cl.
CPC ......... *H04N 7/181* (2013.01); *H04N 21/25841* (2013.01); *H04N 21/4524* (2013.01); *H04L 29/08657* (2013.01); *H04W 4/023* (2013.01)
USPC .................. 348/14.01; 348/143; 725/105

(58) Field of Classification Search
CPC ............ H04N 7/181; H04N 21/25841; H04N 21/4524
USPC .................................. 348/14, 143
See application file for complete search history.

(56) References Cited

U.S. PATENT DOCUMENTS

| | | | |
|---|---|---|---|
| 6,744,740 B2 * | 6/2004 | Chen | 370/255 |
| 6,778,085 B2 * | 8/2004 | Faulkner et al. | 340/541 |
| 6,868,074 B1 | 3/2005 | Hanson et al. | |
| 6,879,574 B2 * | 4/2005 | Naghian et al. | 370/338 |
| 7,412,542 B1 * | 8/2008 | Newson et al. | 709/249 |
| 2001/0051851 A1 | 12/2001 | Suzuki et al. | |
| 2002/0077137 A1 * | 6/2002 | Akhteruzzaman et al. | 455/521 |

(Continued)

OTHER PUBLICATIONS

PCT/US06/34983, International Search Report and Written Opinion of the International Searching Authority mailed Sep. 13, 2007.

(Continued)

*Primary Examiner* — Sath V Perungavoor
*Assistant Examiner* — Xiaolan Xu
(74) *Attorney, Agent, or Firm* — Baker & McKenzie LLP

(57) ABSTRACT

Provided are video nodes for wireless networks and methods thereof that wirelessly extend a wired surveillance system. A wireless interface device services wireless communications between a wired video surveillance network and a wireless viewing node. According to another aspect, a wireless interface device transmits an alert over the wireless network upon a triggering event. In yet another aspect, a technique for viewing an image source from a surveillance system includes displaying available surveillance systems for a user to select according to a display criteria and responsive to selection of an available surveillance system, enabling wireless access to the surveillance system.

37 Claims, 10 Drawing Sheets

(56) References Cited

U.S. PATENT DOCUMENTS

2002/0170064 A1* 11/2002 Monroe et al. ............... 725/105
2005/0190263 A1* 9/2005 Monroe et al. ............... 348/159
2005/0250440 A1* 11/2005 Zhou et al. ................... 455/12.1

OTHER PUBLICATIONS

Linksys Wireless Network Access Point WAP11 User's Guide. Datasheet [online]. Linksys Corporation, 2001 [retrieved on May 9, 2007]. Retrieved from the Internet: <URL: ftp://ftp.linksys.com/pdf/wap11ug.pdf>.

Linksys Wireless PCI Card WMP11 version 2.7 User Guide. Datasheet [online]. Linksys Corporation, 2002 [retrieved on May 9, 2007]. Retrieved from the Internet: <URL: ftp://ftp.linksys.com/pdf/wmp11_ug_v27.pdf>.

* cited by examiner

SURVEILLANCE APPARATUS AND METHOD FOR WIRELESS MESH NETWORK

CROSS REFERENCE TO RELATED APPLICATIONS

This Application claims the benefit of U.S. Provisional Application Ser. Nos. 60/715,305, filed on Sep. 9, 2005, and entitled "Wireless extension of wired video surveillance systems," 60/715,394, filed on Sep. 9, 2005, and entitled "Proximity based choice list," 60/715,381, filed on Sep. 9, 2005, and entitled "Externally initiated broadcast alarm beacon," which are commonly assigned with the present application and incorporated herein by reference.

TECHNICAL FIELD

Disclosed embodiments relate generally to wireless networking, and more specifically relate to communicating multimedia data over wireless mesh networks.

BACKGROUND

Video surveillance systems are found in businesses, schools and homes all over the world. The vast majority of these systems are wired systems in that the video data is transported from the camera(s) to monitoring station(s) via wires or cables. Some of these systems are even connected to the Internet to allow remote viewing. In a known system, the wired cameras can be remotely monitored via the Internet as long as the IP address and port numbers are known and the firewall is setup to allow the monitoring IP address to view the video feed.

While this kind of known system serves a definite security purpose, there are many limitations. For example, law enforcement or other first responder personnel arriving in response to an emergency do not have direct external wireless access to the wired video on the internal wired network. Wireless Internet access in emergency vehicles cannot be counted on in the current state of the network infrastructure, so even if the system is Internet connected, the video still may not be accessible to the emergency responders. If direct wireless access were available, the first responders could react to the situation with increased safety and efficiency.

In addition, for events outside the boundaries of a wired surveillance system requiring temporary surveillance, wires need to be laid to link up wired cameras to the surveillance monitoring location. An example of such a use could be a school with an internal wired video surveillance system. In situations where additional outdoor monitoring would be desirable (for example, athletic events or an outdoors field day), the setting up of wired video monitoring locations to extend the video surveillance coverage can be laborious and costly.

Mesh networks are known to be used in a wide variety of applications. For instance, mesh networks have been known to be used for construction, healthcare, higher education, networked communities, public safety, security and surveillance, warehousing and wireless service delivery.

As is known, mesh networking is a way to route data, voice and instructions between nodes. It allows for continuous connections and reconfiguration around blocked paths by "hopping" from node to node until a connection can be established. Mesh networks are self-healing: the network can still operate even when a node breaks down or a connection goes bad. As a result, a very reliable network is formed which allows peer network nodes to supply back haul services to other nodes in the same network.

Nodes may be connected to peripheral devices such as video equipment for video surveillance purposes. A known implementation of a video node for wireless mesh networks is provided in commonly-assigned U.S. Pub. Pat. App. no. 2006/0176834, entitled "Video Node for Wireless Mesh Network," filed Feb. 7, 2005, which is incorporated by reference herein for all purposes.

With the advent of mobile wireless communications, users may have the ability to receive video feeds from hundreds or thousands of sources. These video sources can be fixed or mobile just as the receiver of video feeds can be fixed or mobile. As more and more businesses extend their wired surveillance systems to provide wireless access to police and private security teams, the number of video sources could number into the thousands of units per city. Hundreds or thousands of video sources within a city can be overwhelming to a video receiver (law enforcement officer, private security, etc.). The problem is how to select the video source of interest quickly. A related problem is how to select the video source from the residence or business alarm system that has just triggered. Accordingly, a simple way to reduce the number of video sources is needed, as well as a technique for initiating an alert to a viewer, and emphasizing that alert.

SUMMARY

Described herein are video nodes for wireless mesh networks, wireless mesh networks using video nodes, apparatus and methods that substantially meet these needs and others.

In an embodiment, a wireless interface device services wireless communications between a wired video surveillance network and a wireless viewing node. The wireless interface device includes a wireless interface unit that wirelessly interfaces with the wireless viewing node. The wireless interface also includes an encryption unit operable to encrypt the wireless communications, and an access unit operable to allow an authorized party at a wireless viewing node access to a surveillance image from the wired video surveillance network.

In accordance with another aspect, a method for viewing an image source from a surveillance system includes displaying available surveillance systems for a user to select according to a display criteria. Responsive to selection of an available surveillance system, the method also includes enabling wireless access to the surveillance system.

DETAILED DESCRIPTION

Figure 1:
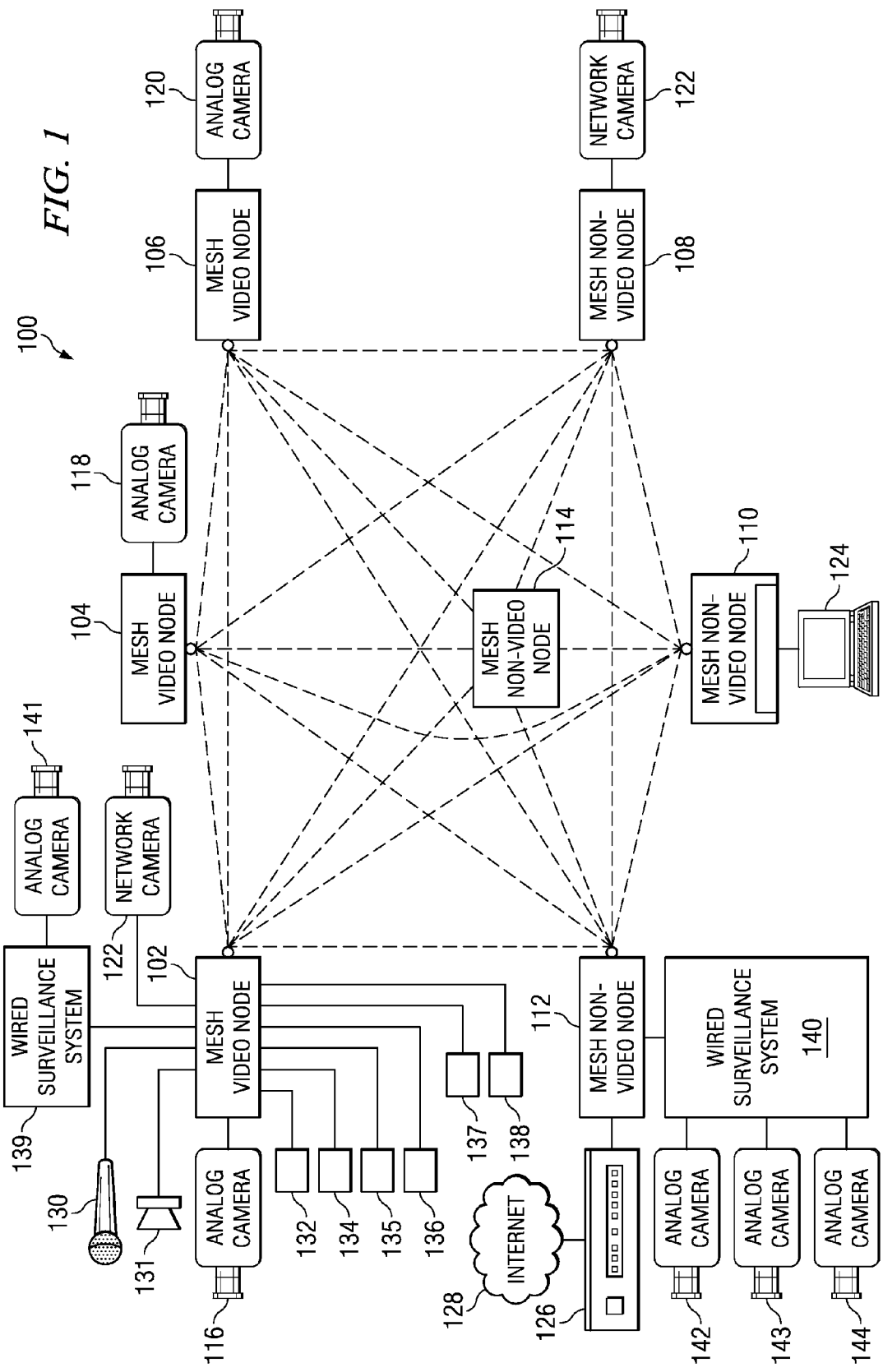
FIG. 1 is a schematic block diagram of a communications network that is in accordance with the present disclosure.

FIG. 1 is a schematic block diagram illustrating a communications network 100 that includes a plurality of wireless mesh nodes 102-114 and a network hardware component 126. Wireless mesh nodes 102-114 include wireless multimedia nodes 102-106 and wireless non-video nodes 108-114.

Surveillance devices may be coupled to wireless mesh nodes 102-108, and may include analog video cameras 116-120 (coupled via a video cable), network video camera 122 (coupled via an Ethernet link), microphone 130, speaker 131, gas detector 132, biohazard detector 134, radiation detector 135, break-glass detector 136, panic alarm button 137, keypad 138, motion detectors (not shown), open door detectors (not shown), et cetera. A wired surveillance system 139 with a feed from wired surveillance devices such as analog camera 141 may also interface with wireless mesh nodes 102-108. Other devices may be coupled to wireless mesh non-video nodes 110-114 such as laptop computer 124 or other computers and other network devices (not shown). Laptop computer 124 may be used to manage multimedia inputs and outputs in the communications network 100, for example, to monitor and control video from cameras, and inputs and outputs from devices 130-138. Wireless multimedia nodes 102-106 provide a video server functionality (i.e., the capability to accept an analog video input and convert it to a digital form suitable for transport over communications network 100. The wireless multimedia nodes 102-106 will be described in greater detail with reference to FIG. 2.

Many existing surveillance systems (e.g., 139, 140) are wired systems, in that the video data is transported from the camera(s) to monitoring station(s) via wires or cables. An exemplary wired surveillance system 140 is linked to surveillance cameras (or other surveillance devices) 142-144. Known wired surveillance systems may be connected to the internet in order to view images therefrom. However, a problem with such known systems is that in order to remotely access the images over the internet, the IP address and port numbers must be known, and any firewall should be configured to allow access to the remote connection. Accordingly, such known wired surveillance systems do not lend themselves well to external viewing over the internet. Thus, wired surveillance system 140 may be coupled to a mesh non-video node 112 in order to provide direct wireless access to the wired surveillance system 140 over communications network 100. Accordingly, communication network 100 may be used to wirelessly extend the reach of wired surveillance system 140. Benefits of extending the reach of wired surveillance system 140 beyond the wires include wireless external access, for instance, by emergency responders, security personnel, et cetera. Furthermore, the coverage of wired surveillance system 140 may be expanded to areas not covered by the wired system. Other features and benefits are provided herein.

The wireless multimedia nodes 102-106 and wireless non-video nodes 108-114 are operably coupled to the network hardware 126 via wireless mesh network connections between the nodes. The network hardware 126, which may be a router, switch, bridge, modem, system controller, et cetera provides a wide area network connection 128 for the communications network 100. Each of the wireless mesh nodes 102-114 has an associated antenna or antenna array to communicate with the wireless mesh nodes in its area. Further details regarding mesh video nodes for wireless mesh networks and methods thereof are described in commonly-assigned U.S. patent application Ser. No. 11/307,410, entitled "Video node for wireless mesh network," and is hereby incorporated by reference for all purposes.

Typically, messages sent within data packets traverse a wireless mesh network by hopping from one wireless mesh node to another wireless mesh node until the data packets reach their destination. Usually these data packets jump between adjacent nodes, called neighbors e.g., neighboring nodes 102 and 104, nodes 108 and 110, et cetera. Generally, wireless mesh network topologies provide for a generous number of interconnections among neighboring nodes throughout the network 100. FIG. 1 depicts a fully connected mesh network, although this is not necessary for operation.

Each node in the wireless mesh computes a source tree (or routing table) that defines the paths to all neighboring nodes within its reach. These neighbors communicate with one another efficiently using special messages that propagate the mesh network. Changes in the mesh are reported regularly to make the end-to-end configuration dynamic.

Link metrics may be used to maximize performance as traffic moves edge-to-edge through the wireless mesh. These metrics can be based on measuring signal strength, stability, transfer rate, bit error rate, latency, number of hops, or other 'per link' parameters. Each link therefore carries a 'cost' and the overall load can be balanced efficiently by whatever path presents the least cost.

The communications between wireless mesh nodes 102-114 may have self-management, self-configuring, self-tuning, self-healing and self-monitoring capabilities. A management console (e.g., running on laptop 124) may be used to provide a visualization of actual interconnections between nodes 102-114, and may also provide a means to monitor the communication network's 100 status from edge-to-edge, and provide performance and activity statistics. The console may also provide some form of command and control over the communications network 100, including wireless mesh node updates, software upgrades, and reconfigurations.

Security is a major concern for mesh networks. Traffic within communications network 100 preferably should be secured and outside devices, including video sources and those that use the mesh's Ethernet services, should be prohibited from accessing internal mesh traffic. Features like digital signatures can be used to ensure that only authorized systems participate in the mesh. User traffic between nodes can also be encrypted to prevent wireless eavesdropping, for instance, by using 128-bit and 256-bit AES encryption, WEP, or the like. The communications network 100 may also support other security standards available on other Ethernet-based and wireless networks. Compatibility with any end-to-end security provisions, such as virtual private networks (VPNs), may also be implemented for securing over-the-air communications between network devices.

It is noteworthy that a wireless mesh node is not a wireless access point. The very nature of communications within the mesh is very different from that which occurs between access points and client/server systems. The IEEE 802.11 standards body recognized this difference by providing two separate modes of communication: Ad-hoc and Infrastructure. Although there have been some attempts to integrate mesh nodes with access points on a common platform, and sharing components, such as the chassis, powers supply, and radio/ antenna, to reduce costs. In essence, the wireless mesh network provides a backbone network, and is preferably separate from an access network. Nevertheless, access point devices may be coupled to mesh nodes at the edge of the network.

Network addresses may be assigned to network devices attached to a wireless mesh node in one of two ways. In a first technique, the network address can be assigned manually to the network device. If it is done manually, it must be unique among network devices attached to that mesh node and it must fall within the range of legal network addresses defined for that mesh node. Typically, each mesh node will use the same range of network addresses, so once that device is configured with a particular address, it will likely be usable on any of the other nodes in the mesh network. Alternatively, in a second technique, the network address may be assigned automatically to the device. The network address will once more fall in the range of legal private network addresses defined for that particular node. The automatic assignment may be accomplished through a sequence of transactions between the network device and the software running on the mesh node. A mechanism that may be used is the standard DHCP (Dynamic Host Configuration Protocol) commonly used in IP-based Local Area Networks. Whether assigned manually or automatically, the address may be a class C private network address (for example, 192.168.012.001) that is unique among the devices attached to that particular wireless mesh node.

The mesh nodes in the network will each have a unique address. Once more, it will be a private network address. The addresses may be class C addresses (255 potential members), class B addresses (65534 potential members) or class A addresses (up to 16,777,216 members). In an embodiment, the network addresses actually assigned to wireless mesh nodes would each be even multiples. For example, if the class B private network address range is used, and the multiple was four, the addresses of the first four mesh nodes on the network could be 172.016.000.004 for a first node, 172.016.000.008 for a second node, 172.016.000.012 for a third node, and 172.016.000.016 for a fourth node, et cetera. The unassigned addresses between the node addresses may be reserved for destination network translation addresses for the peripheral devices attached to each node. For example, a single network device attached to a third node with a private network address of 192.168.0.1 would be addressed from elsewhere in the mesh network with an address of 172.016.000.013 (i.e., 012+ 1). The third wireless mesh node would, using its network address translation function, translate the destination address from 172.016.000.013 to 192.168.0.1 before passing the message along. Likewise, the destination address of a message originating at the network device subtending the third wireless mesh node would be translated into the correct 172.016.000.xxx address associated with the device for which the message was intended and the source address field would be translated into 172.016.000.013 to reflect the source address as viewed from within the mesh network. The net result of using this scheme is that every network device in the mesh network and every subtending network device attached to the mesh nodes will have a unique private network address associated with it. All of the devices can be addressed from within the network by the appropriate 172.016.xxx.xxx address (using the example shown above).

Additionally, the wireless network node may make provision for connection of the mesh network to the Internet using a network device 126, such as a router. Routers typically include a Network Address Translation function that allows that router to have a single public network address while providing internet accessibility to the network devices connected to the other side of the router. This may be accomplished with messages passing between the Internet and the LAN network devices by translating source and destination addresses associated with the LAN network devices into the single public network address assigned to the router and embedding a port number into the message to distinguish which of the LAN devices is the source or destination.

Figure 2:
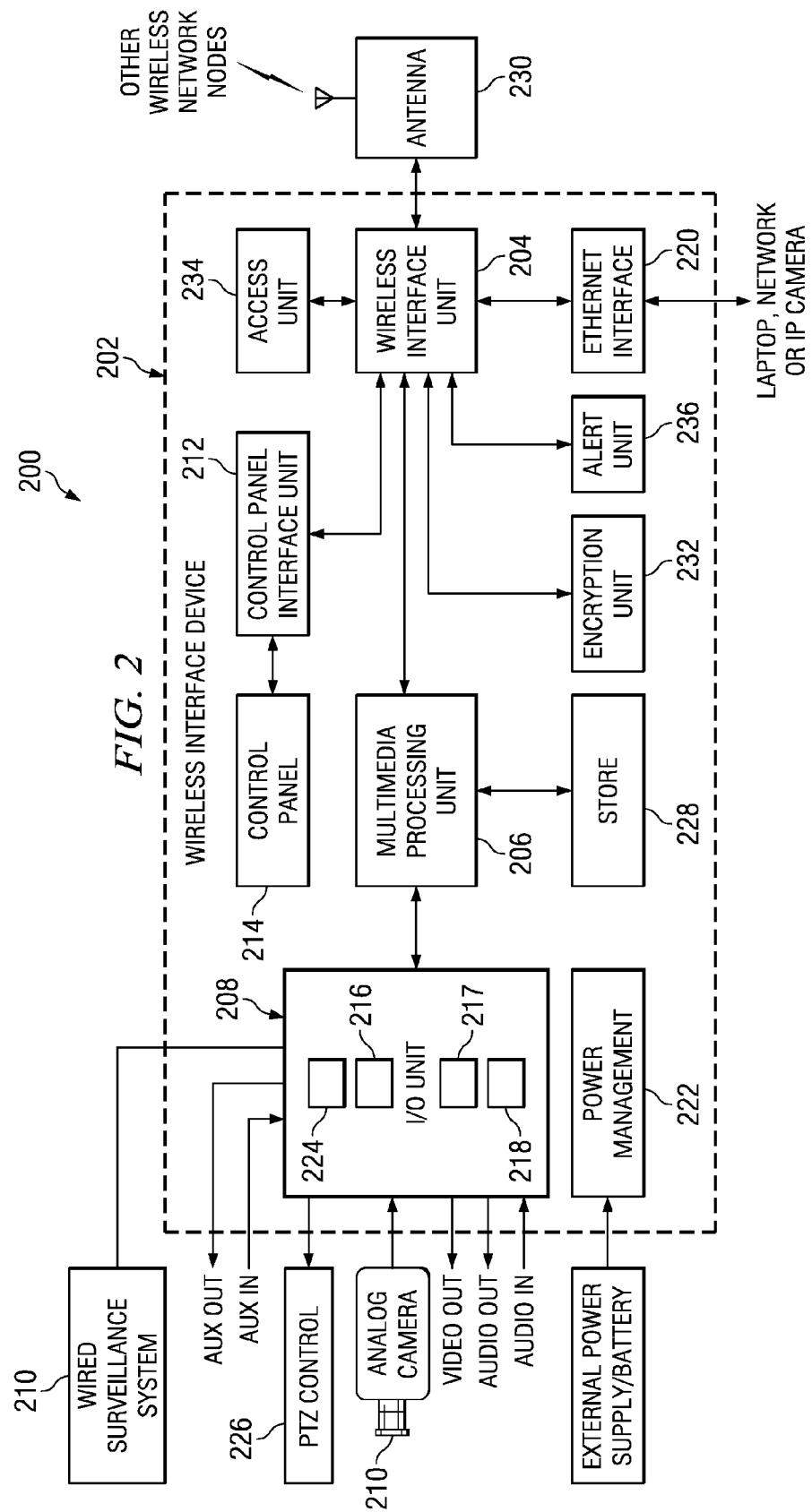
FIG. 2 is a schematic block diagram illustrating a wireless multimedia node that includes a wireless interface device for servicing communications in a wireless data network in accordance with the present disclosure.

FIG. 2 is a schematic block diagram illustrating a wireless multimedia node 200 that includes a wireless interface device 202 for servicing communications in a wireless data network (e.g., a mesh network 100) between a wired video surveillance system 210 and a wireless viewing node (e.g., 110 of FIG. 1).

Generally, the wireless interface device 202 includes a wireless interface unit 204, an encryption unit 232, and an access unit 234. The wireless interface unit wirelessly interfaces with the wireless viewing node (e.g., 110). The encryption unit 232 is operable to encrypt the wireless communications. The access unit 234 is operable to allow an authorized party at a wireless viewing node (e.g., 110) access to a surveillance image from the wired video surveillance system 210.

The wireless interface device 202 may further include a multimedia processing unit 206, an input/output unit 208, a control panel interface unit 212, and an alert unit 236. In this embodiment, the respective units are arranged as shown, although it should be apparent to a person of ordinary skill that the respective functions may be arranged differently in other embodiments, while still being in accordance with the claims set forth below.

In order to provide secure communications, the encryption unit 232 may provide encryption schemes for the wireless communications, as well as further encryption to a video stream. Thus, an encrypted video stream may be transmitted via an encrypted wireless link to provide extra protection to a surveillance network. Examples of encryption schemes for the wireless communication include 128-bit and 256-bit AES encryption, WEP, or the like, as mentioned in the security discussion above. Further encryption of the surveillance images can be performed using a conventional encryption scheme.

Access unit 234 may store at least one access key. An access key may include a channel number, an encryption key, and/or a Service Set Identifier (SSID). Such access keys may be used to set up a communications link to the wireless interface device 202. Access to the wireless interface device 202 may also be obtained via a username/password combination, or any other conventional identification and user authentication scheme, including biometrics e.g., finger print, retinal scan, et cetera. Upon successful user authentication, an access key may be released to a wireless viewing node, which is used to set up a wireless communication with wireless interface device 202.

Alert unit 236 may facilitate an alarm beacon upon the triggering of an event. For instance, the alert unit 236 may operate to initiate an alert signal that may include a video source to view, an access key, an IP address of a video source to view, a physical address of an alert location, a contact name, a contact phone number, a map of the alert location, a location map of hazards, and/or a photograph of at least one authorized person. An alert may be triggered by a fire alarm, a smoke detector, a gas detector, a break glass detector, a panic button, and a motion detector, or any other triggering event. The alert unit 236 is operable to transmit an alert signal until at least one of the following events occur: manual deactivation of the alert, a predetermined alert time is reached, and/or the alert is acknowledged by a predetermined number of viewers.

The control panel interface unit 212 may be operable to receive a channel selection input and a node selection input from a control panel 214 that is operably coupled to the control panel interface unit 212. The control panel 214 may include a channel selector and a node selector.

Input/output unit 208 may include analog video interface 216, auxiliary bus controller 217, audio interface 218, and camera orientation controller 224. Analog video interface 216 may take in an analog video signal and convert it to a digital format, as well as receive a digital signal and convert it to an analog video output. Auxiliary bus controller 217, via the aux in and aux out ports, may receive and transmit signals to and from auxiliary devices shown in FIG. 1, such as gas detector 132, biohazard detector 134, radiation detector 135, break-glass detector 136, panic alarm button 137, keypad 138, as well as others. I/O unit 208 may also include a serial interface controller to provide a Universal Serial Bus (USB) port and an RS232 port for connection of various peripheral devices. The audio interface 218 may make provision for audio input and output at the wireless multimedia node 200 by accepting an audio input through an external connector, converting it to a digital format and encoding the audio input for transport through the communications network 100. The audio output performs the opposite function. That is, it accepts an outbound digital audio stream, decodes it and converts the signal back to an audio output. The wireless interface device 202 may further include a camera orientation controller 224 operably coupled to the wireless interface device 204, which interfaces with actuating hardware 226 to control the pitch, tilt and zoom of a camera.

Multimedia processing unit 206 is operable to process multimedia information from several devices, which may include for example, an analog video camera, an infrared camera and a microphone. Multimedia processing unit 206 may take the digital output of the Analog Video to Digital Video Converter 216 and encode it into a series of digital video frames suitable for transport over an Ethernet or Internet Protocol (IP) network. Multimedia processing unit 206 may perform digital signal processing, compression, and enhancement algorithms on video and audio signals passing therethrough.

An Ethernet interface unit 220 may be operably coupled to the wireless interface unit to provide connectivity to Ethernet-enabled devices such as a computer, or a local area network or IP camera. Ethernet interface unit 220 provides an external physical Ethernet interface as well as the Media Access Control (MAC) and Physical layer (PHY) functions for the module. The Ethernet interface unit provides true Ethernet connectivity and is fully compatible and interoperable with all Ethernet switching and routing protocols (including IPv6, VPN tunnels, VLANs, OSPF, BGP, RIP, Multicast, MPLS, et cetera). Information such as voice data or video may be transferred at different user-selectable priority levels depending on the nature of the traffic. To ensure interoperability, any proprietary mesh traffic and routing between modes should be transparent to any Ethernet devices connected to the mesh network. Typically, the mesh node employs the Internet Protocol (IP) internally within the mesh, it may operate externally as a virtual Ethernet switch, therefore allowing support for any non-IP protocol in virtually any application, including Appletalk, IPX, NetBios/BEUI, SNA, et cetera. Additionally, devices coupled to the Ethernet interface unit 220 may be powered using power-over-Ethernet enabled devices in accordance with IEEE 802.3af standards, which are herein incorporated by reference.

Power management unit 222 may be operably coupled to the wireless interface unit 204 to manage the power requirements for the wireless interface device 202, and in some instances, external devices connected thereto. It receives a supply voltage, regulates it to the required voltages for the module and distributes the power to the other units. Power management unit 222 may also include functions that control the charging and discharge of an external or internal battery, as well as controlling power conservation, and supplying power to power-over-Ethernet devices that are coupled via the Ethernet interface 220. In some instances, power conservation function may be performed by monitoring the performance of the various units and selectively shutting down some units depending on a predetermined state of operation.

In some instances, the multimedia processing unit may further include a store for storing multimedia information 228, such as solid state flash memory, a hard disk, or any other form of storage medium capable of storing multimedia data. Store 228 may record, for instance, video and audio information such that if the wireless interface device 202 periodically loses contact with other wireless network nodes, then upon regaining contact with the mesh network, store 228 may be accessed to review the multimedia information stored therein. Accordingly, even if the radio signal is jammed or interference temporarily prevents its communications operation in the wireless mesh, the store 228 will continue to record multimedia data for later review. The store 228 may also be configured to record multimedia data upon receiving an activation signal, for example, triggered by a motion detector, a break-glass detector, or other such triggering device.

As one of average skill in the art will appreciate, the wireless interface device 202 of FIG. 2 may be implemented using one or more integrated circuits. For example, the wireless interface unit 204 may be implemented on one integrated circuit, the multimedia processing unit 206 and input/output unit 208 may be implemented on a second integrated circuit, the control panel interface unit 212 on a third integrated circuit, and the remaining components of the wireless interface unit 202, less the antenna 230 may be implemented on a fourth integrated circuit. As an alternate example, the wireless interface device 202 may be implemented on a single integrated circuit.

Figure 3:
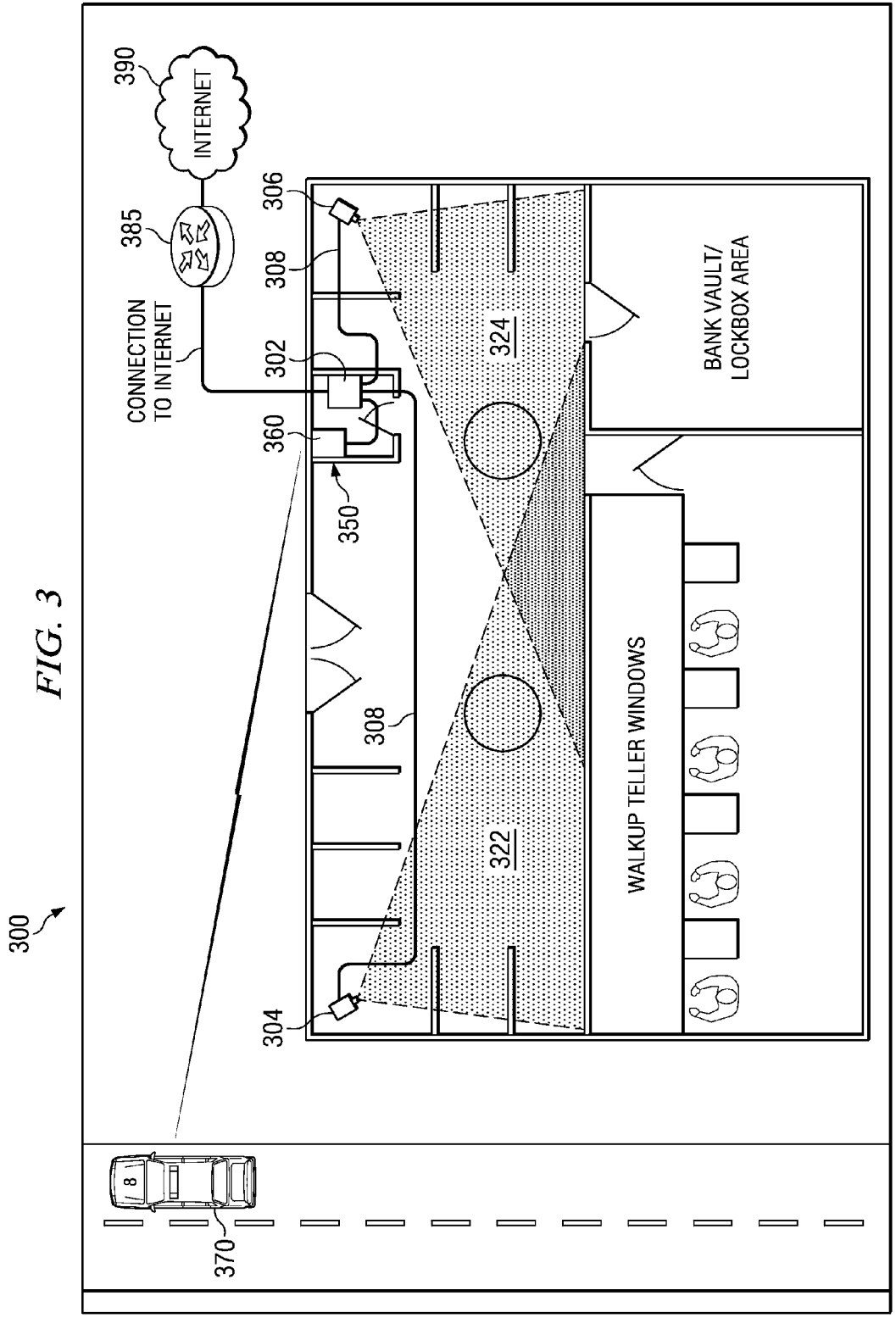
FIG. 3 is a schematic diagram illustrating an application of wirelessly extending a wired surveillance system in accordance with the present disclosure.

FIG. 3 is a schematic diagram illustrating an application of wirelessly extending a wired surveillance system 350. The wired surveillance system 350 includes a wired surveillance server 302 coupled to cameras 304, 306 via wires 308. The exemplary illustration of FIG. 3 depicts a bank building, with cameras 302 and 304 set up to view areas 322 and 324 respectively. A wireless interface device 360 may be coupled to the bank's 300 existing video surveillance system 350 to transport video images to a wireless viewing terminal in the police car 370. Thus, in this embodiment, a wired video surveillance system 350 can be enhanced to allow law-enforcement, emergency responders, security personnel, et cetera to view the camera(s) showing the situation. This provides a first responder with the ability to actually see what is happening inside the business, school or home prior to entry, thus providing potentially life saving information. This is of particular importance for police officers responding to a bank robbery or to fire fighters responding to a building fire.

A known alternative for remote monitoring of a video surveillance system 350 is via the Internet 390. However, the known scheme requires knowledge of the IP address, port numbers, and firewall parameters of router 385 in order to allow the monitoring IP address to view the video feed.

Such known systems for remote monitoring via the internet 390 have several limitations. Specifically, law enforcement or other first responder personnel arriving in response to an emergency do not have direct external wireless access to the wired surveillance system 350 on the internal network. Also, wireless Internet access in emergency vehicles cannot be counted on in the current state of the network infrastructure, so even if the system is Internet connected, the video still may not be accessible to the emergency responders. If direct wireless access were available, the first responders could react to the situation with increased knowledge, safety and efficiency.

Figure 4:
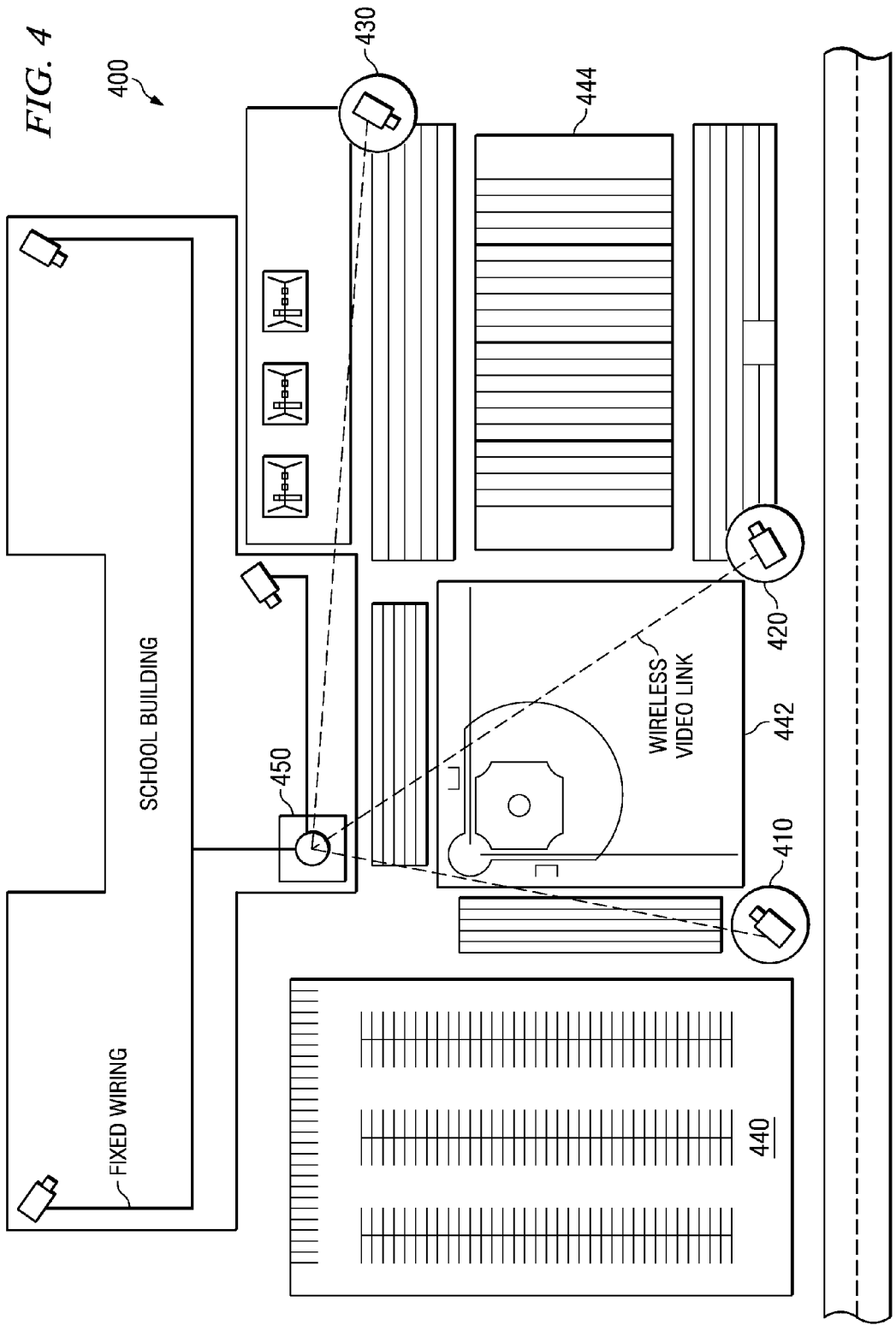
FIG. 4 is a schematic diagram illustrating another application of wirelessly extending a wired surveillance system in accordance with the present disclosure.

Another exemplary application is shown in FIG. 4, illustrating a wireless extension of a wired security system 450. Such wireless extension could allow expansion of the video surveillance system to encompass alternative viewing locations or additional video surveillance locations outside the boundaries of the wired system. An example of such a use could be a school 400 with an internal wired video surveillance system 450. In situations where additional outdoor monitoring would be desirable (for example, athletic events or an outdoors field day), temporary wireless video monitoring locations 410, 420, 430 could be set up to extend the video surveillance coverage. With the wireless extension, additional wiring is not required to extend video surveillance to the parking lot 440 and athletic fields 442, 444.

With the advent of mobile wireless communications, users now have the ability to receive video feeds from hundreds or thousands of sources. These video sources can be fixed or mobile just as the receiver of video feeds can be fixed or mobile. As more and more businesses extend their wired surveillance systems to provide wireless access to police, fire, paramedic, private security teams, et cetera, the number of video sources could number into the thousands of units per city. The problem then becomes how to select a video source of interest quickly.

Figure 5:
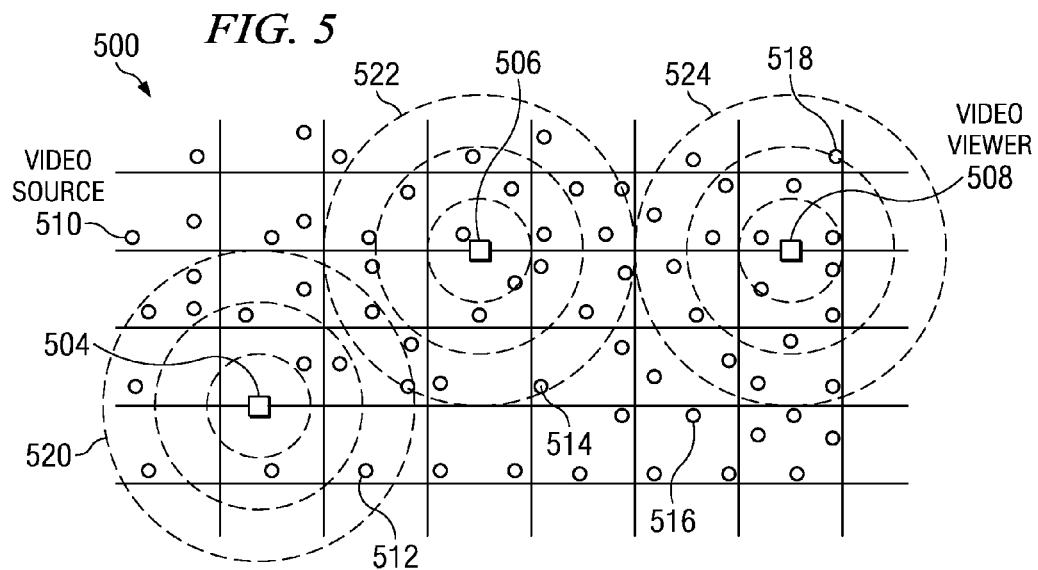
FIG. 5 is a schematic diagram showing a typical city street grid map with many video source locations and fixed or mobile video viewing locations in accordance with the present disclosure.

FIG. 5 is a schematic diagram showing a typical city street grid map 500 with many video source (camera or wired surveillance system) locations e.g., 510-518 (represented by small circles) and fixed or mobile video viewing locations e.g., 504-508 (represented by small rectangles). The dotted concentric circles 520-524 represent selectable distances (display ranges) from the respective viewing locations 504-508.

The receiver of the video feed controls the selection of the viewable distance. The three concentric circles 520, 522, 524 around each viewing location 504, 506, 508 could represent a minimum, medium or maximum display range. It should be appreciated that there is nothing magic about three ranges for the receiving node to display—there could just as easily be 10 ranges or two ranges to be selected by the video receiver to limit the number of video sources.

Each of the video sources 510-518 has a specific geo-location determined by using a Global Positioning System (GPS) device or by any other known locating means. A list that contains the video source name (business name, etc.) and the GPS coordinates may be distributed to each of the viewing nodes 504-508. The list transmitted to the viewing nodes 504-508 may contain additional information such as physical location (street address and suite number), business contact information (with phone numbers and photos), camera ID, et cetera. An example of a video source name and GPS location list is shown below in Table 1.

TABLE 1

| Video Source Name | GPS Location (Lat, Long, Elev) | RF Channel | SSID | WEP |
|---|---|---|---|---|
| Oshman's Sporting Goods | 32.08642°, −96.135790°, 550 ft | 1 | oshmans | Key_107 |
| Northern Trust Bank | 32.08123°, −96.132468°, 547 ft | 1 | ntb | Key_57 |
| Sears North parking lot | 32.08246°, −96.131357°, 557 ft | 6 | sears | None |
| Sears South parking lot | 32.08299°, −96.131388°, 540 ft | 6 | sears | None |

If the viewing node (mobile or fixed) 504-508 can determine its own location in the same coordinated system, a determination of the relative distance from the sources 510-518 can be determined. A list of video sources 510-518 and their distance from a video viewer can be generated by the viewer and ordered. From this list a determination can be made to show video sources that are within one-quarter mile or one-half mile, or whatever value is deemed suitable by the viewer. This limits the scope of the video sources to display.

Based on the number of video sources within the scope selected by a video receiver, thumbnail images 616-626 can be "tiled" across the screen of a video receiver (e.g., FIG. 6A) or a choice list (e.g., FIG. 6B) can be displayed. The video sources displayed as thumbnail images or in a list may change over time if the video receiver is moving.

Figure 6A:
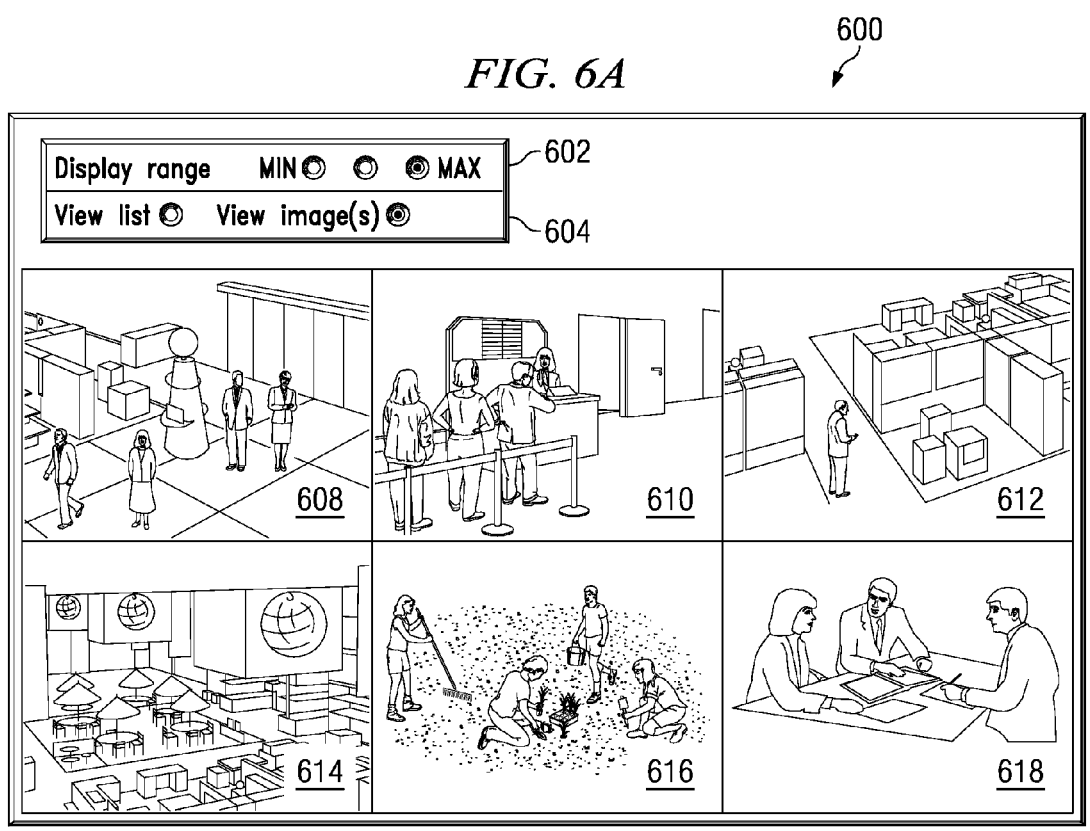
FIGS. 6A-6E are schematic diagrams of user interfaces in accordance the present disclosure.

FIG. 6A is a schematic diagram of a user interface 600. In this embodiment, the relative distance from the video source 510-518 to the video receiver 504-508 can be used to determine a subset of the total number of video sources that are practical to view. Here, a display range selector 602 is set to a maximum range, and a user interface selector 604 is set to view images. Thus, images 608-618 are shown on the user interface 600 to show images for a maximum range.

Figure 6B:
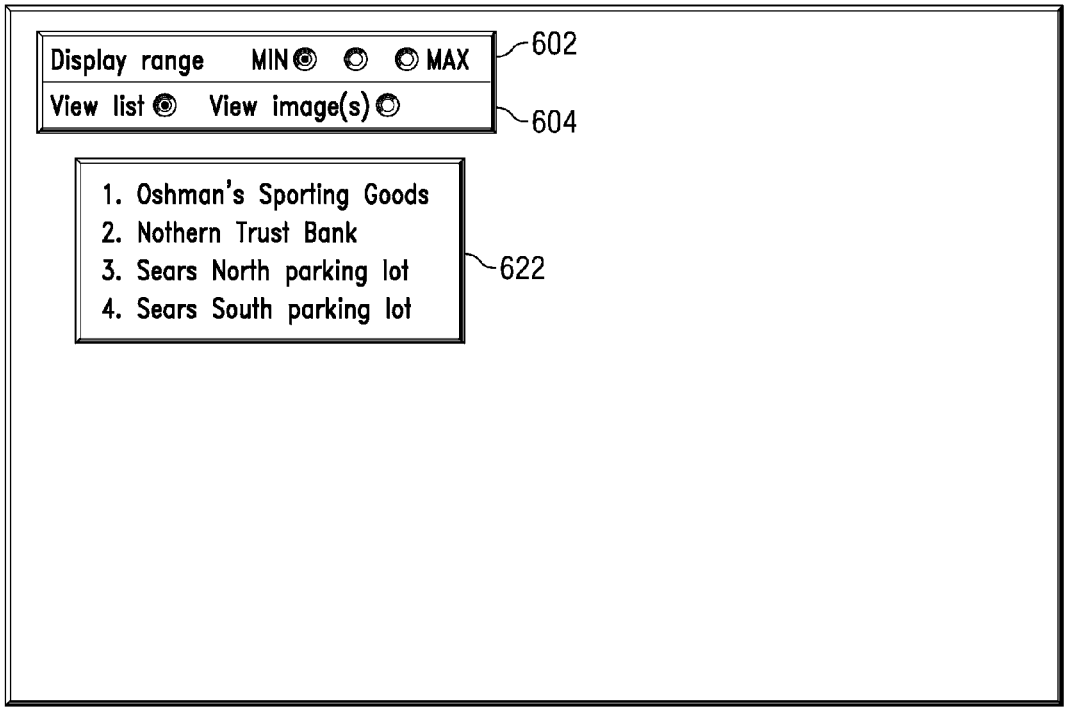

FIG. 6B is a schematic diagram of a user interface 620, in which a choice list 622 can be displayed to allow a user to select, via display range selector 602, a subset of the total number of video sources in an area. Here, the display range 604 is set to a minimum range to limit the number of video sources that may be viewed in the choice list 622.

Figure 6C:
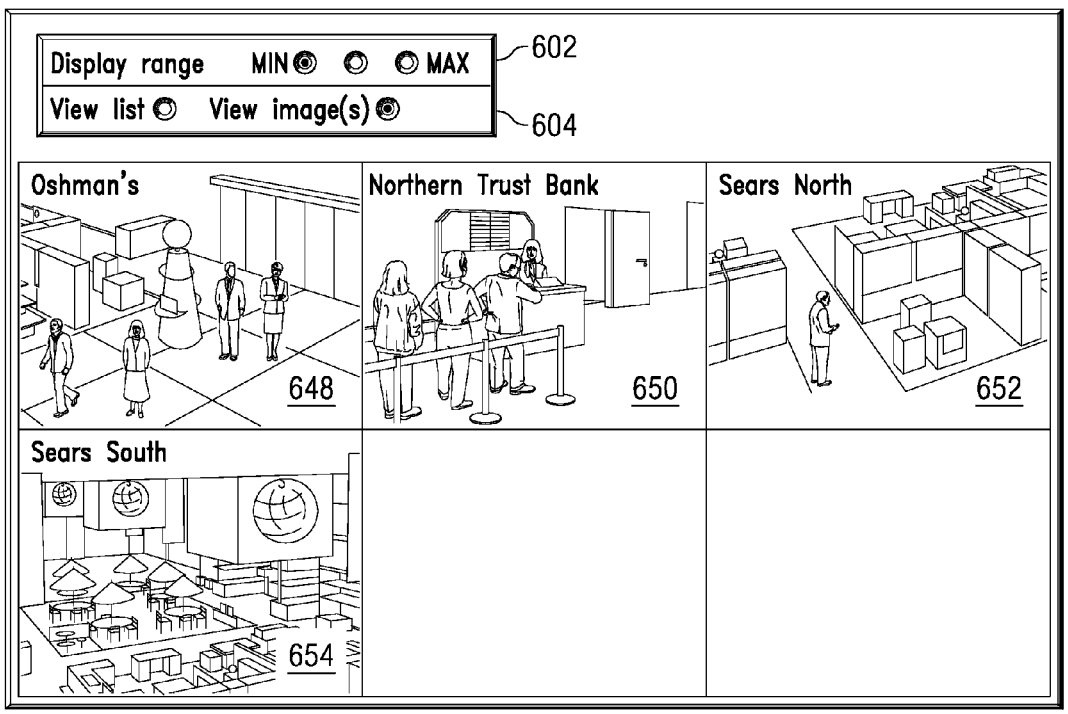

FIG. 6C is a schematic diagram of a user interface 640, showing thumbnail images 648-654 for a more limited display range 602 than that shown in FIG. 6A.

Figure 6D:
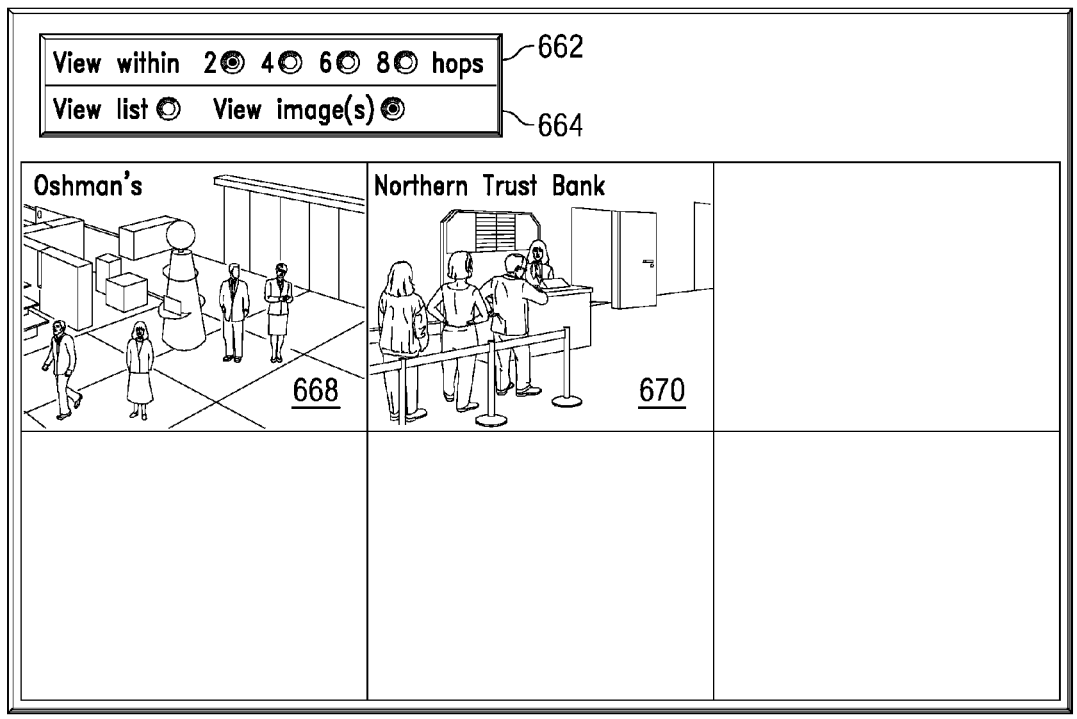
Figure 6E:
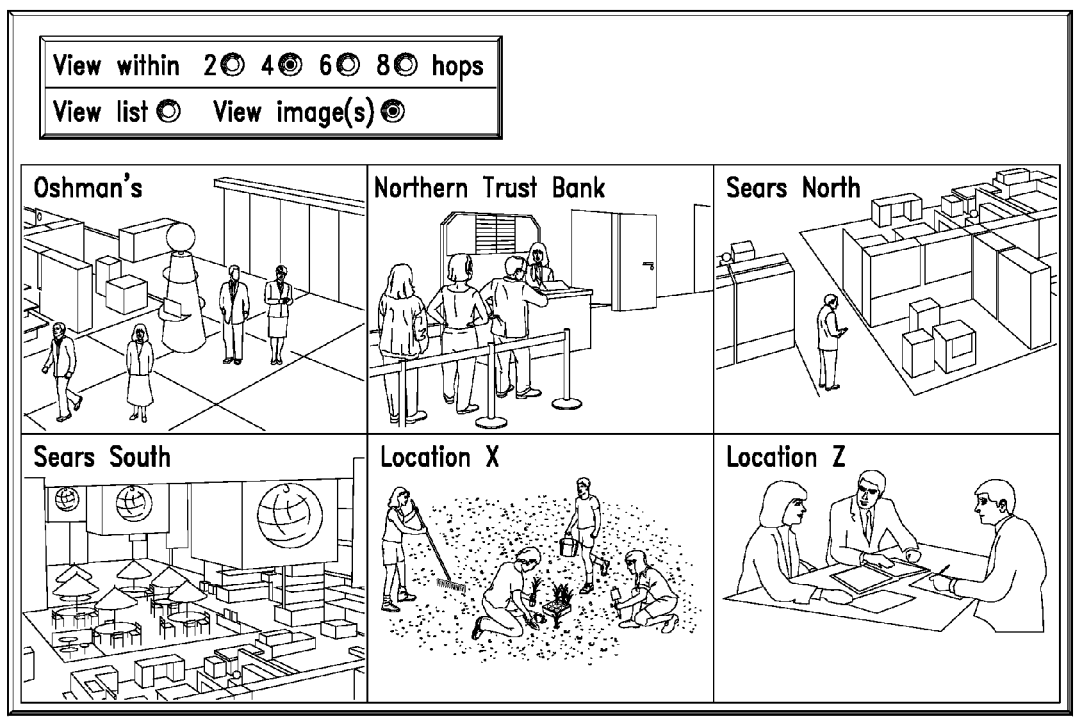

Referring now to FIGS. 6D and 6E, in another embodiment of a user interface 660, 680, a mobile viewer can use a neighbor table to limit the number of hops to video sources. This allows a user to selectively limit the list of video sources on display. The display range selector 662 may limit the number of video sources by using the hop-count or time to live (TTL) from network parameters. The hop-count represents the transmission path from the source node to the viewing node. If the source transmits directly to the viewing node, the hop-count is one. As intervening nodes receive and retransmit the video signal, the viewer, the hop-count increases (one for each node to the viewer). A list with the video source, including business name, may be displayed on the video viewer. The viewer can select the maximum number of hops, for example, 2, 4 or 6 (or more) to limit the number of video sources to view. If the maximum number of hops is set to 4 (i.e., FIG. 6E), any video source that is 4 or less hops away from the video viewer will appear tiled on the viewer's screen. There may be some hysteresis in the hop-count as a network path from source to viewer is not deterministic. Due to obstructions, the source to viewer path can change with time.

Figure 7:
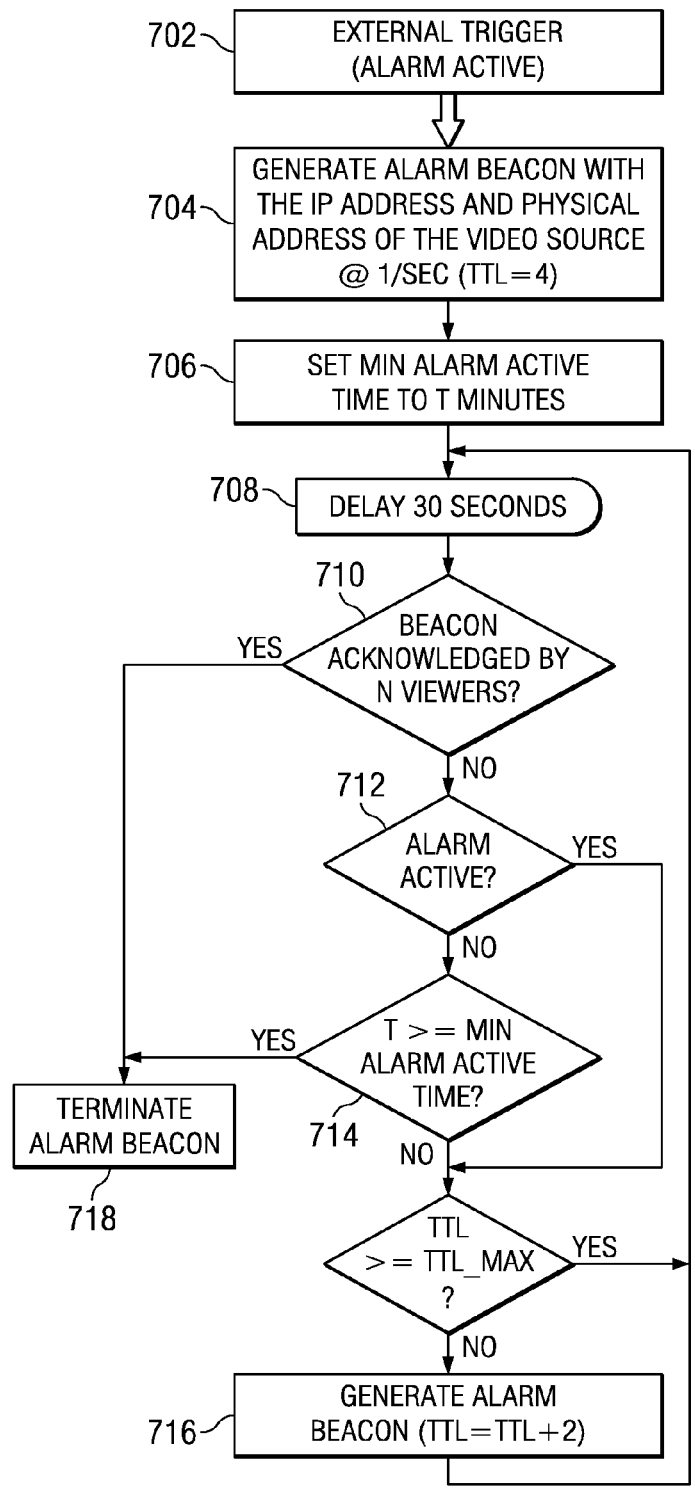
FIG. 7 is a logic diagram illustrating the operation of an alarm generated broadcast beacon operation in accordance with the present disclosure.

As previously stated, a multitude of potential video sources within a city may be overwhelming to a video receiver (law enforcement officer, private security, etc.). In light of this overwhelming information, an issue remains regarding how an emergency responder is alerted to the video source at a residence or business where a fire or robbery has been detected. Addressing this issue, FIG. 7 provides a functional logic diagram illustrating the operation of the alarm generated broadcast beacon operation.

An alarm is triggered at step 702. Thus, in accordance with an embodiment, an alert to a video source to view may be transmitted to one or more fixed or mobile video receivers or viewers as a result of an alarm (fire alarm, break glass detector, motion detector, smoke detector, panic button, etc.). An alarm beacon in the form of a custom RF message may be generated at step 704. The beacon or message may contain the IP address of the video source(s) where the alarm has been triggered as well as the physical address. Other information may also be transmitted such as the phone number of the residence or business, the name or names and photos of authorized security contacts from the residence or business, and the source of the triggering event. The residence owner's name and/or the name of the business establishment may also be transmitted with the alarm beacon. The photos and names of the residence owners or business owners may allow the first responder to determine if he or she is talking to the owners or the perpetrators.

The alarm beacon may propagate to a predetermined set of adjacent nodes at a configurable rate (i.e. once per second, once per five seconds, etc.).

In an exemplary embodiment, a minimum alarm active time is set for a period of T minutes, at step 706. The purpose of the minimum alarm active timer is to ensure that the shut-off of an alarm system, for example, by a perpetrator after a break-in does not stop the transmission of the alarm beacon. Optionally, there may be a predetermined delay, e.g., 30 seconds at step 708, to determine whether the alarm has received an acknowledgment.

The alarm beacon may continue to propagate until the alarm is acknowledged by a predetermined number of viewers (1 to N), at step 710, or until the alarm condition is removed, at step 712, or a minimum alarm active timer expires, at step 714.

The alarm broadcast beacon may work with as few as one video source and one remote video viewer. The broadcast beacon may also notify text only (non-video) receivers for the physical address of the residence or business where the alarm was triggered, e.g., by SMS text message, e-mail or SIP messaging, or the like. Additional nodes (mesh network, point to point, optical or wired networks) may be utilized to extend the distance between the alarm source and the remote viewer. The IP address of the video source and the physical address of the residence or business may be transmitted to a remote viewer without any action taken or required by the remote viewer. Acknowledgement of the video or text message by a preset number of viewers (1 to N) may terminate alarm beacon. If no acknowledgements are received, the transmission of the beacon may terminate after the minimum alarm timer expires, at step 718.

Figure 8A:
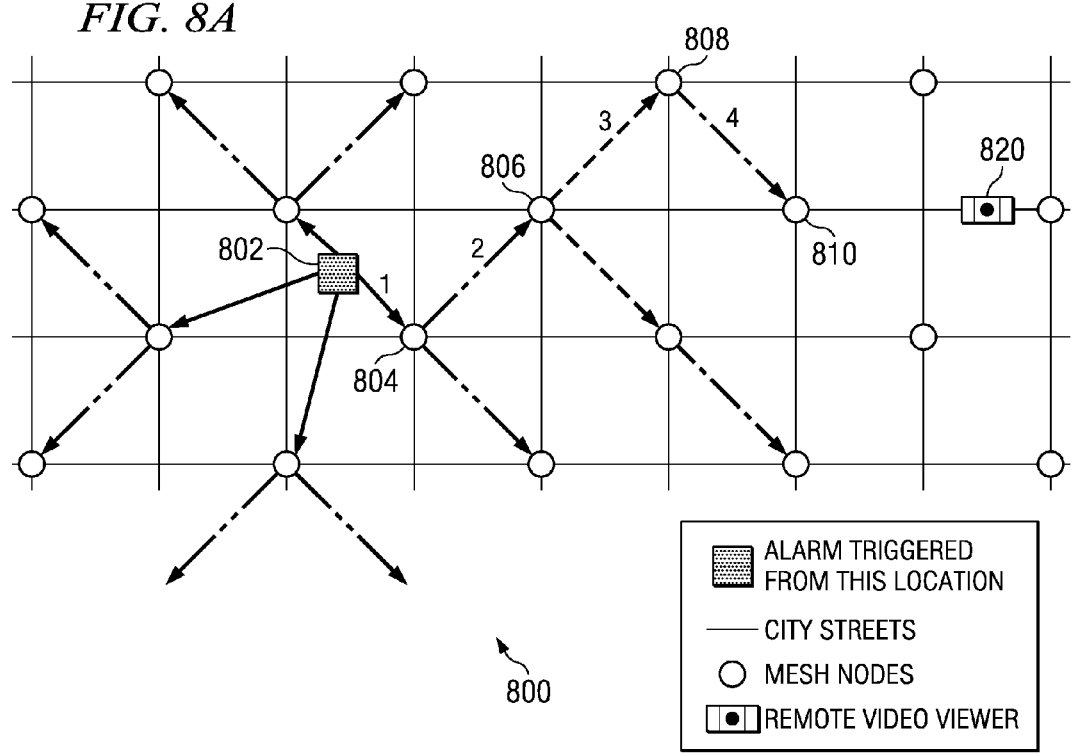
FIGS. 8A-8B are schematic diagrams of an exemplary city map depicting a scenario where a certain portion of a city is covered by mesh nodes in accordance with the present disclosure.

FIG. 8A is a schematic diagram of an exemplary city map 800, depicting a scenario where a certain portion of a city is covered by mesh nodes. If an alarm is triggered from a business 802, an alarm beacon is activated and initially sends the beacon to neighboring mesh nodes 804-810 up to four hops away. Setting the time to live (TTL) to 4 limits the number of hops to four. The TTL is decremented each time a node rebroadcasts the beacon. FIG. 8A depicts a scenario where an alert beacon does not reach a remote viewer 820 in four hops.

Figure 8B:
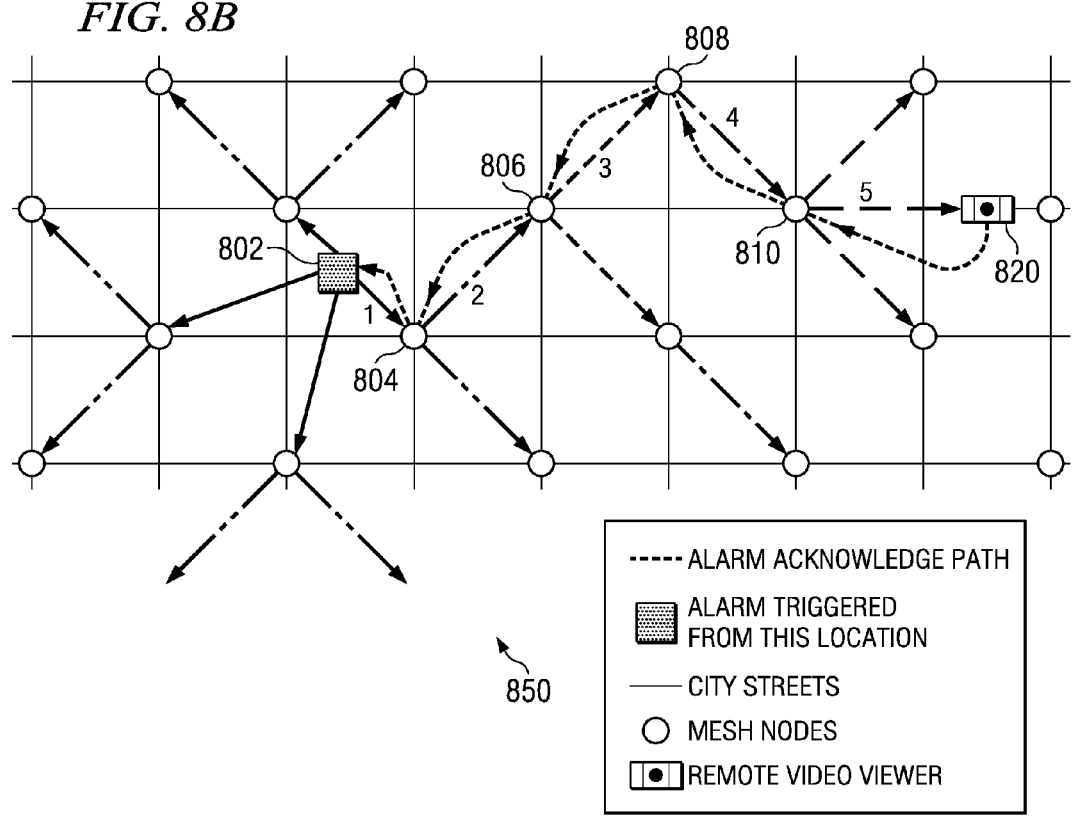

FIG. 8B is a schematic diagram of an exemplary city map 850, illustrating the next step in the alarm beacon protocol. Because the beacon from business 802 was not acknowledged by a remote viewer (no viewer was within 4 hops of the alarm trigger location), the alarm beacon protocol increments the TTL to send the beacon beyond the initial setting (i.e., as shown in step 716 of FIG. 7). On the fifth hop, a remote viewer is found at node 820 and an acknowledgement signal is returned to the originator of the alarm beacon.

Figure 9:
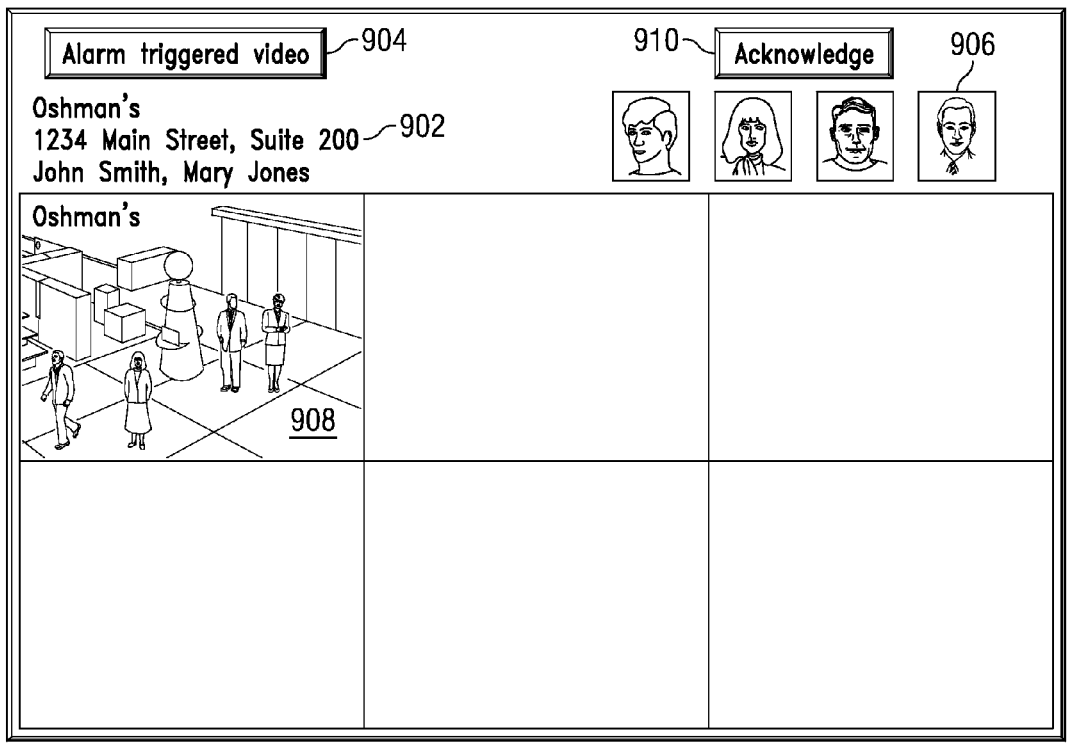
FIG. 9 is a schematic diagram illustrating an exemplary user interface for a remote video viewer, depicting an external trigger initiated alarm broadcast beacon screen in accordance with the present disclosure.

FIG. 9 is a schematic diagram illustrating an exemplary user interface 900 for a remote video viewer, depicting an external trigger initiated alarm broadcast beacon screen. The latest alarm location may be displayed at 902 below the Red "Alarm triggered video" indicator text 904. When several alarm triggered video screens are displayed, the residence owners or business name, the physical address 902 and photos of the residence owners or business security contacts 906 from the triggering source may be displayed along with the video screen or screens from the source 908. A remote viewer may select an "acknowledge" button 910 to acknowledge the alert.

As one of ordinary skill in the art will appreciate, the term "operably coupled", as may be used herein, includes direct coupling and indirect coupling via another component, element, circuit, unit, or module where, for indirect coupling, the intervening component, element, circuit, unit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

Having described several embodiments, it will be recognized by those of ordinary skill in the art that various modifications, alternative constructions, and equivalents may be used without departing from the spirit of the disclosed embodiments. Accordingly, the presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R. §1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background of the Invention" is not to be construed as an admission that technology is prior art to any invention(s) in this disclosure. Neither is the "Brief Summary of the Invention" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A wireless interface device that services wireless communications between a wired video surveillance network and a wireless viewing node, the wireless interface device comprising:
    a wireless interface unit that wirelessly interfaces with the wireless viewing node;
    an encryption unit operable to encrypt the wireless communications, wherein the wireless communications traverse a wireless mesh network connection; and
    an access unit operable to allow an authorized party at the wireless viewing node access to a tiling of surveillance images representative of content captures by cameras in the wired video surveillance network, the tiling of surveillance images adaptively provided to the authorized party based on the relative locations of the cameras.

2. A wireless interface device according to claim 1, further comprising:
    a communication channel selector for selecting a communications channel, wherein the communications channel is associated with a predetermined parameter.

3. A wireless interface device according to claim 2, wherein the predetermined parameter comprises at least one of a channel number, an encryption key, and a Service Set Identifier (SSID).

4. A wireless interface device according to claim 2, wherein the predetermined parameter comprises a channel number associated with an IEEE 802.11 standard frequency.

5. A wireless interface device according to claim 1, wherein the access unit is configurable over a network connection.

6. A wireless interface device according to claim 1, further comprising an alert unit.

7. A wireless interface device according to claim 6, wherein the alert unit is operable to transmit an alert signal comprising at least one of a video source to view, a triggering event source, an access key, an IP address of a video source to view, a physical address of an alert location, a contact name, a contact phone number, a map of the alert location, a location map of hazards, and a photograph of at least one authorized person.

8. A wireless interface device according to claim 6, wherein an alert is triggered by one of a fire alarm, a smoke detector, a gas detector, a break glass detector, a panic button, and a motion detector.

9. A wireless interface device according to claim 6, wherein the alert unit is further operable to transmit an alert signal until at least one of the following events occur: manual deactivation of the alert, a predetermined alert time is reached, and the alert is acknowledged by a predetermined number of viewers.

10. A wireless interface device according to claim 1, wherein adaptively providing the tiling of surveillance images to the authorized party comprises displaying only surveillance images within a specified relative distance.

11. A wireless interface device according to claim 1, wherein adaptively providing the tiling of surveillance images to the authorized party comprises providing a listing of surveillance images from which individual surveillance images may be selected for viewing.

12. A wireless interface device according to claim 1, wherein adaptively providing the tiling of surveillance images to the authorized party comprises changing the tiling of surveillance images based on changes in a relative location of the access unit.

13. A wireless interface device according to claim 1, wherein adaptively providing the tiling of surveillance images to the authorized party comprises determining a subset of a total number of video sources that is practical to view.

14. A wireless interface device according to claim 1, further comprising:
    a management console, wherein the management console is operable to provide control and command of wireless communications;
    wherein the access unit is operable to provide and receive content, through the wireless interface unit and under the direction of an external management console;
    wherein the access unit is operable to provide, under the direction of the management console, surveillance images representative of content captured by a first camera associated with the wireless viewing node; and
    wherein the access unit is operable to receive, under the direction of the management console, surveillance images representative of content captured by a second camera associated with another wireless viewing node, wherein the surveillance images representative of the content captured by at least the first and second cameras are tiled and wherein the tiling of the surveillance images is done adaptively based on the relative locations of the cameras.

15. A method for viewing an image source from a surveillance system, the method comprising:
    providing a wireless interface unit;
    providing a wireless viewing node;
    wirelessly interfacing the wireless interface unit with the wireless viewing node;
    providing an access unit;
    allowing, via the access unit, an authorized party at the wireless viewing node access to a tiling of surveillance images representative of content captured by cameras in the surveillance system via wireless communications that traverse a wireless mesh network connection, the tiling of surveillance images adaptively provided to the authorized party based on the relative locations of the cameras;
    displaying, at the wireless viewing node, available surveillance systems for a user to select according to a display criteria; and
    responsive to selection of an available surveillance system, enabling wireless access to the surveillance system.

16. A method according to claim 15, wherein enabling wireless access to the surveillance system comprises establishing a connection with the wireless interface device.

17. A method according to claim 16, wherein establishing the connection comprises accessing a store for storing at least one access key.

18. A method according to claim 17, wherein the access key comprises at least one of a channel number, an encryption key, and a Service Set Identifier (SSID).

19. A method according to claim 15, wherein the display criteria is a geographic area.

20. A method according to claim 15, wherein the display criteria is a geographic loci from a viewer location.

21. A method according to claim 15, wherein the display criteria is a geographic loci from a selected geographic location.

22. A method according to claim 15, wherein the display criteria is a communication range.

23. A method according to claim 22, wherein the communication range is determined by a number of hops.

24. A method according to claim 15, wherein the display criteria is an alert.

25. A method according to claim 15, wherein the alert is triggered by an E911 call.

26. A method according to claim 15, wherein the display criteria is at least a part of a name associated with the surveillance system.

27. A method according to claim 15, wherein the displaying available surveillance systems comprises displaying a textual list of available surveillance systems.

28. A method according to claim 15, wherein the displaying available surveillance systems comprises displaying a map of available surveillance systems.

29. A method according to claim 15, wherein adaptively providing the tiling of surveillance images to the authorized party comprises displaying only surveillance images within a specified relative distance.

30. A method according to claim 15, wherein adaptively providing the tiling of surveillance images to the authorized party comprises providing a listing of surveillance images from which individual surveillance images may be selected for viewing.

31. A method according to claim 15, wherein adaptively providing the tiling of surveillance images to the authorized party comprises changing the tiling of surveillance images based on changes in a relative location of the access unit.

32. A method according to claim 15, wherein adaptively providing the tiling of surveillance images to the authorized party comprises determining a subset of a total number of video sources that is practical to view.

33. A method according to claim 15, further comprising:
a management console, wherein the management console is operable to provide control and command of wireless communications;
wherein the access unit is operable to provide and receive content, through the wireless interface unit and under the direction of an external management console;
wherein the access unit is operable to provide, under the direction of the management console, surveillance images representative of content captured by a first camera associated with the wireless viewing node; and
wherein the access unit is operable to receive, under the direction of the management console, surveillance images representative of content captured by a second camera associated with another wireless viewing node.

34. A wireless interface device that services wireless communications between an associated wireless viewing node and a video surveillance network, the wireless interface device comprising:
a wireless interface unit that wirelessly communicates with other wireless nodes through the wireless communications, wherein the wireless communications traverse a wireless mesh network connection;
an access unit in communication with the wireless interface unit, the access unit operable to provide and receive content, through the wireless interface unit and under the direction of an external management console;
wherein the access unit is operable to provide, under the direction of the management console, a tiling of surveillance images representative of content captured by a first camera associated with the wireless viewing node; and
wherein the access unit is operable to receive, under the direction of the management console, surveillance images representative of content captured by a second camera associated with another wireless viewing node, wherein the surveillance images representative of the content captured by at least the first and second cameras are tiled and wherein the tiling of the surveillance images is done adaptively based on the relative locations of the cameras.

35. A wireless interface device according to claim 34, wherein the surveillance images representative of content captured by at least one of the first and the second cameras are viewable using a display.

36. A wireless network that wirelessly extends a surveillance system, the wireless network comprising:
wireless communications, wherein the wireless communications traverse a wireless mesh network connection;
a first wireless interface device associated with a first wireless viewing node, the first wireless interface device in communication with a first camera;
a second wireless interface device associated with a second wireless viewing node, the second wireless interface device in communication with a second camera;
a management console, the management console operable to provide control and command of the wireless communications;
wherein the management console is operable to coordinate access of content captured by the first and second cameras to the first and second wireless interface devices;
wherein the first wireless interface device is operable to provide, under the direction of the management console, surveillance images representative of content captured by the first camera;
wherein the first wireless interface device is operable to receive, under the direction of the management console, surveillance images representative of content captured by the second camera; and
wherein at least one of the first and second wireless interface devices are operable to provide the surveillance images in a tiled manner, the tiling of the surveillance images adaptively provided according to the locations of the cameras.

37. A wireless interface device according to claim 36, wherein the surveillance images representative of content captured by at least one of the first and the second cameras are viewable using a display.

* * * * *